(12) United States Patent
Mayers

(10) Patent No.: US 11,682,162 B1
(45) Date of Patent: *Jun. 20, 2023

(54) NESTED STEREOSCOPIC PROJECTIONS

(71) Applicant: Tanzle, Inc., Scotts Valley, CA (US)

(72) Inventor: Michael T. Mayers, Placitas, NM (US)

(73) Assignee: Tanzle, Inc., Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,667

(22) Filed: Oct. 8, 2021

Related U.S. Application Data

(63) Continuation of application No. 17/180,671, filed on Feb. 19, 2021, now Pat. No. 11,145,113.

(51) Int. Cl.
    *G06T 15/20* (2011.01)
    *G06T 15/04* (2011.01)
    *H04N 13/344* (2018.01)

(52) U.S. Cl.
    CPC .............. *G06T 15/20* (2013.01); *G06T 15/04* (2013.01); *H04N 13/344* (2018.05)

(58) Field of Classification Search
    None
    See application file for complete search history.

(56) References Cited

U.S. PATENT DOCUMENTS

| | | |
|---|---|---|
| 2007/0279415 A1 | 12/2007 | Sullivan et al. |
| 2009/0195555 A1 | 8/2009 | Nystad et al. |
| 2011/0175899 A1 | 7/2011 | Bittar et al. |
| 2011/0187706 A1 * | 8/2011 | Vesely ................... G06T 15/00 345/419 |
| 2012/0176369 A1 * | 7/2012 | Suzuki ................ H04N 13/302 345/419 |
| 2012/0262446 A1 | 10/2012 | Im et al. |
| 2013/0057540 A1 * | 3/2013 | Winnemoeller ........ G06T 19/20 345/419 |

(Continued)

OTHER PUBLICATIONS

Spindler et al., "Use your head: Tangible windows for 3D information spaces in a tabletop environment." ITS '12: Proceedings of the 2012 ACM International Conference on Interactive Tabletops and Surfaces, Nov. 2012, 245-254.

(Continued)

*Primary Examiner* — Anh-Tuan V Nguyen
(74) *Attorney, Agent, or Firm* — Fish & Richardson P.C.

(57) ABSTRACT

A system, method or compute program product for generating stereoscopic images. One of the methods includes identifying, in a first three-dimensional coordinate system of a first three-dimensional virtual environment, a location and orientation of a first virtual object that is a virtual stereoscopic display object; identifying an eyepoint pair in the first virtual environment; identifying, in a second three-dimensional coordinate system of a second three-dimensional virtual environment, a location and orientation of a second virtual object that is in the second virtual environment; for each eyepoint of the eyepoint pair, rendering an inferior image of the second virtual object; for each eyepoint of the eyepoint pair, render a superior image of the first virtual environment, comprising rendering, in the superior image for each eyepoint, the corresponding inferior image onto the virtual stereoscopic display object; and display, on a physical stereoscopic display, the first virtual environment.

22 Claims, 7 Drawing Sheets

(56) References Cited

U.S. PATENT DOCUMENTS

| | | |
|---|---|---|
| 2013/0182225 A1 | 7/2013 | Stout |
| 2013/0300823 A1 | 11/2013 | Chu et al. |
| 2014/0118506 A1 | 5/2014 | Uhl |
| 2014/0247277 A1 | 9/2014 | Guenter et al. |
| 2014/0306995 A1 | 10/2014 | Raheman et al. |
| 2015/0054823 A1 | 2/2015 | Dzhurinskiy et al. |
| 2015/0235447 A1 | 8/2015 | Abovitz et al. |
| 2015/0335235 A1 | 11/2015 | Pisani |
| 2015/0348326 A1 | 12/2015 | Sanders et al. |
| 2017/0228928 A1 | 8/2017 | Terahata |
| 2018/0205940 A1 | 7/2018 | Donovan |
| 2019/0102949 A1 | 4/2019 | Sheftel et al. |
| 2019/0304166 A1 | 10/2019 | Yu et al. |

OTHER PUBLICATIONS

Lu et al., "A Survey of Motion-Parallax-Based 3-D Reconstruction Algorithms," IEEE Transactions on Systems, Man, and Cybernetics— Part C: Applications and Reviews, 34(4):532-548, Nov. 2004.

\* cited by examiner

NESTED STEREOSCOPIC PROJECTIONS

CROSS-REFERENCE TO RELATED APPLICATION

This application is a continuation application of, and claims priority to pending U.S. application Ser. No. 17/180,671, filed on Feb. 19, 2021. The above referenced application is incorporated by reference as part of the disclosure of this document.

TECHNICAL FIELD

This disclosure relates to a display system, and in particular to a system that generates and displays virtual or composite stereoscopic images.

BACKGROUND

Three dimensional (3D) capable electronics, computing hardware devices, and real-time computer-generated three-dimensional computer graphics have been a popular area of computer science for the past few decades, with innovations in visual, audio, tactile and biofeedback systems. Much of the research in this area has produced hardware and software products that are specifically designed to generate greater realism and more natural computer-human interfaces.

A planar stereoscopic display, e.g. a LCD-based or a projection-based display, shows two images, called "stereoscopic" images, with disparity between them on the same planar surface. By temporal and/or spatial multiplexing the stereoscopic images, the display results in the left eye seeing one of the stereoscopic images and the right eye seeing the other one of the stereoscopic images. It is the disparity of the two images that results in viewers feeling that they are viewing three dimensional scenes with depth information.

SUMMARY

This specification describes a computer system that generates a pair of stereoscopic images of a superior environment that includes a virtual stereoscopic display device. The virtual stereoscopic display device can be rendered as displaying a second pair of stereoscopic images of a second, inferior environment. In some implementations, the system can generate the second pair of stereoscopic images of the inferior environment, and project the second pair of stereoscopic images as a texture onto a model of the virtual stereoscopic display device to generate the pair of stereoscopic images of the superior environment.

Particular embodiments of the subject matter described in this specification can be implemented so as to realize one or more of the following advantages.

Using techniques described in this specification, a user can simulate the operations of a physical stereoscopic display device in a virtual environment, using a corresponding virtual stereoscopic display device. By viewing images generated by systems described herein, the user can view stereoscopic images displayed on the virtual stereoscopic display device as if the virtual stereoscopic display device were real. Thus, the user can freely and efficiently experiment with different configurations of the virtual stereoscopic display device, without having to reconfigure the hardware of the device, which the user would have to do if the user were experimenting with different configurations of a physical stereoscopic display device.

Using some techniques described in this specification, a system can parallelize the operations of generating a pair of stereoscopic images across a distributed computing system with multiple nodes, where the pair of stereoscopic images depicts a superior environment that includes a virtual stereoscopic display rendering a pair of stereoscopic images of an inferior environment. In particular, the system can generate the pair of stereoscopic images of the superior environment on a first computer or computer system, and the pair of stereoscopic images of the inferior environment on a second computer or computer system. The first computer can then obtain the pair of stereoscopic images of the inferior environment from the second computer in order to finish generating the pair of stereoscopic images of the superior environment.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
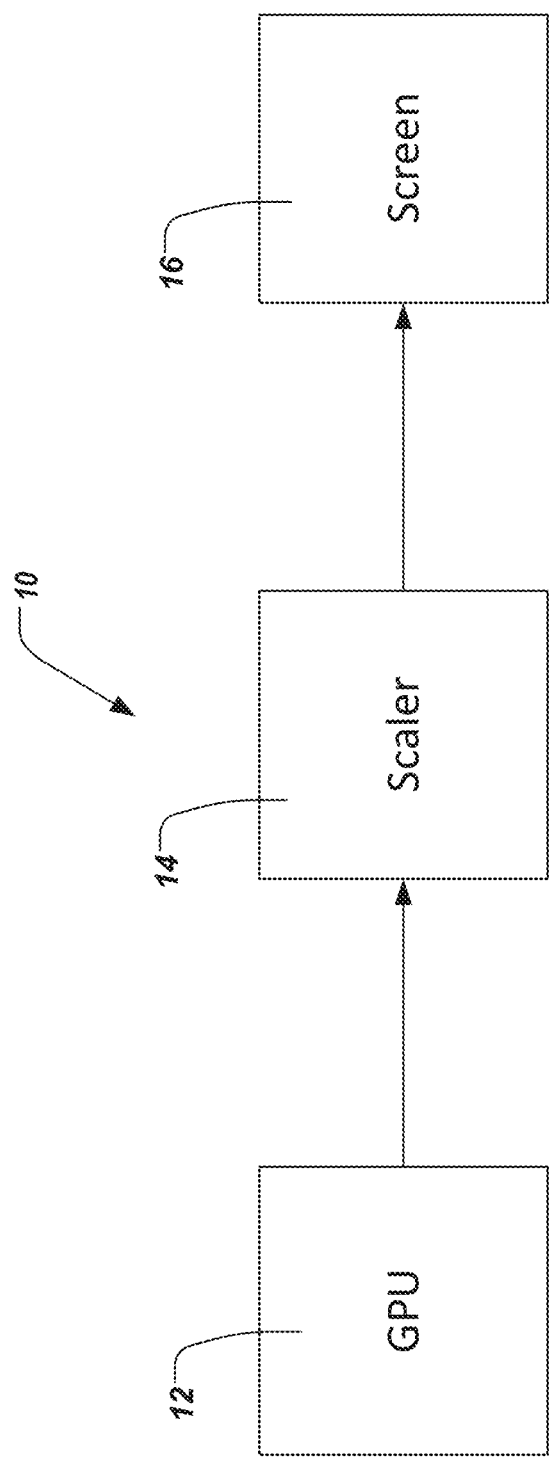
FIG. 1 presents a prior art display chain.

FIG. 1 illustrates a typical conventional display chain 10, which includes the following components:

1. Graphics Processing Unit (GPU). The GPU 12 typically resides on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

2. Scaler. The scaler 14 is a video processor that converts video signals from one display resolution to another. This component takes as input the video levels (e.g., for R, G, and B) for each pixel output from the GPU, and processes them in various ways, before outputting (usually) modified video levels for RGB in a format suitable for the panel, usually in the same 8-bit range of 0-255. The conversion can be a scaling transformation, but can also possibly include a rotation or other linear or non-linear transformation. The transformation can also be based on a bias of some statistical or other influence. The scaler 14 can be a component of a graphics card in the personal computer, workstation, etc.

3. Panel. The panel 16 is the display screen itself. In some implementations, the panel 16 can be a liquid crystal display (LCD) screen. In some other implementations, the panel 16 can be a component of eyewear that a user can wear. Other display screens are possible.

Time Sequential Stereo Displays

A stereoscopic display is any display that is configured to display stereoscopic images. Unlike a monoscopic image, a stereoscopic image pair includes two images—right and left. The right image is to be delivered to only the right eye, and the left image is to be delivered to only the left eye. In a time sequential stereo display, this separation of right and left images is performed in time, and thus, it must contain some time-dependent element which separates these two images. There are two common architectures.

Figure 2:
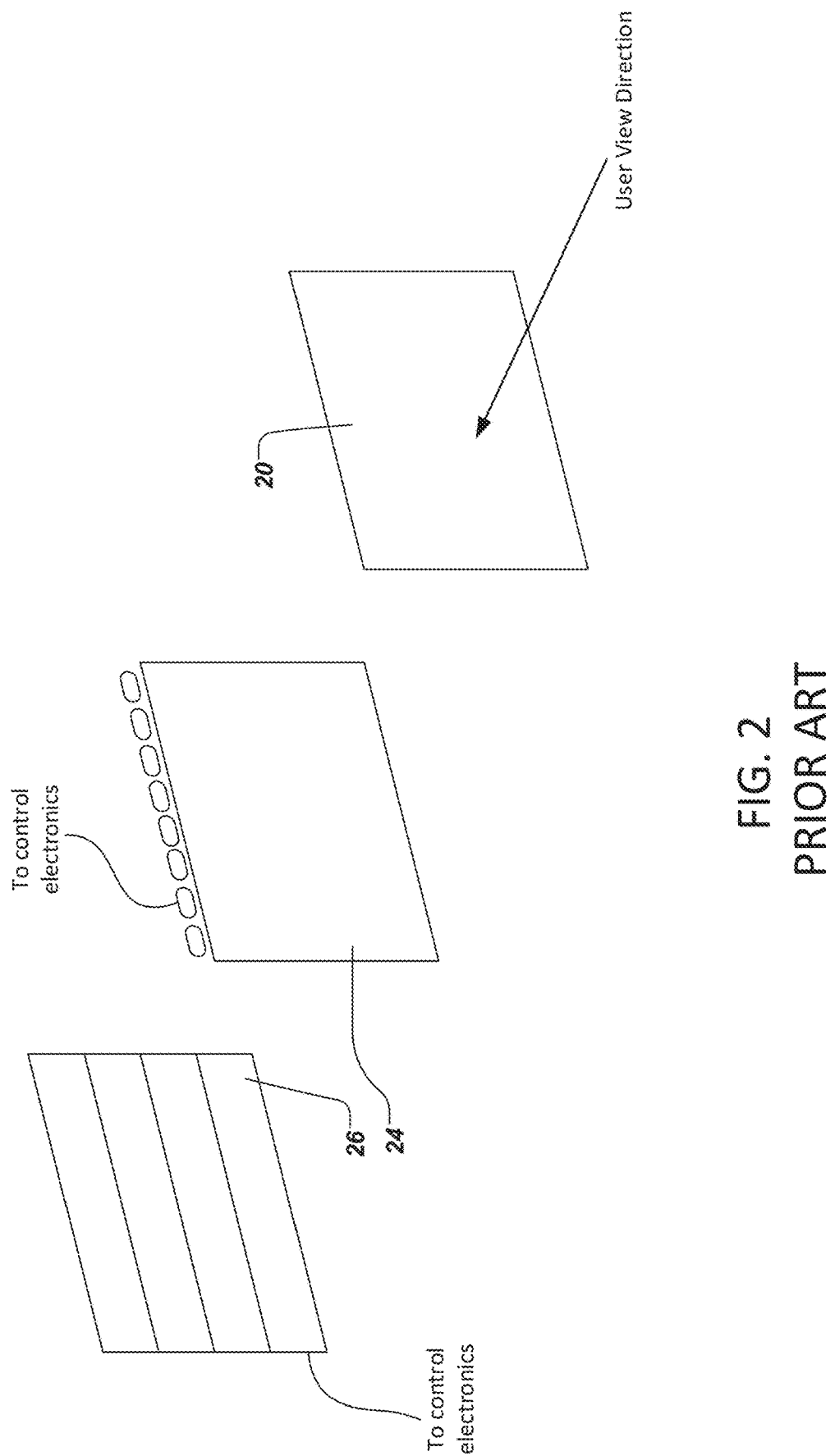
FIG. 2 presents a prior art polarization switch architecture.

The first architecture, shown in FIG. 2, uses a device called a polarization switch (PS) 20 which may be a distinct (separate) or integrated LC device or other technology switch. The polarization switch 20 is placed in front of the display panel 24, specifically between the display panel 24 and the viewer. The display panel 24 can be an LCD panel which can be backlit by a backlight unit 26, or any other type of imaging panel, e.g., an organic light emitting diode (OLED) panel, a plasma display, etc., or any other pixelated panel display used in a time-sequential stereo imaging system. The purpose of the polarization switch 20 is to switch the light between two orthogonal polarization states. For example, one of these states may be horizontally linearly polarized light (horizontal linear polarization state), and the other may be vertically linearly polarized light (vertical linear polarization state); however, other options are possible, e.g., left and right circular polarization states, etc., the key feature being that the two polarization states are orthogonal.

Figure 3A:
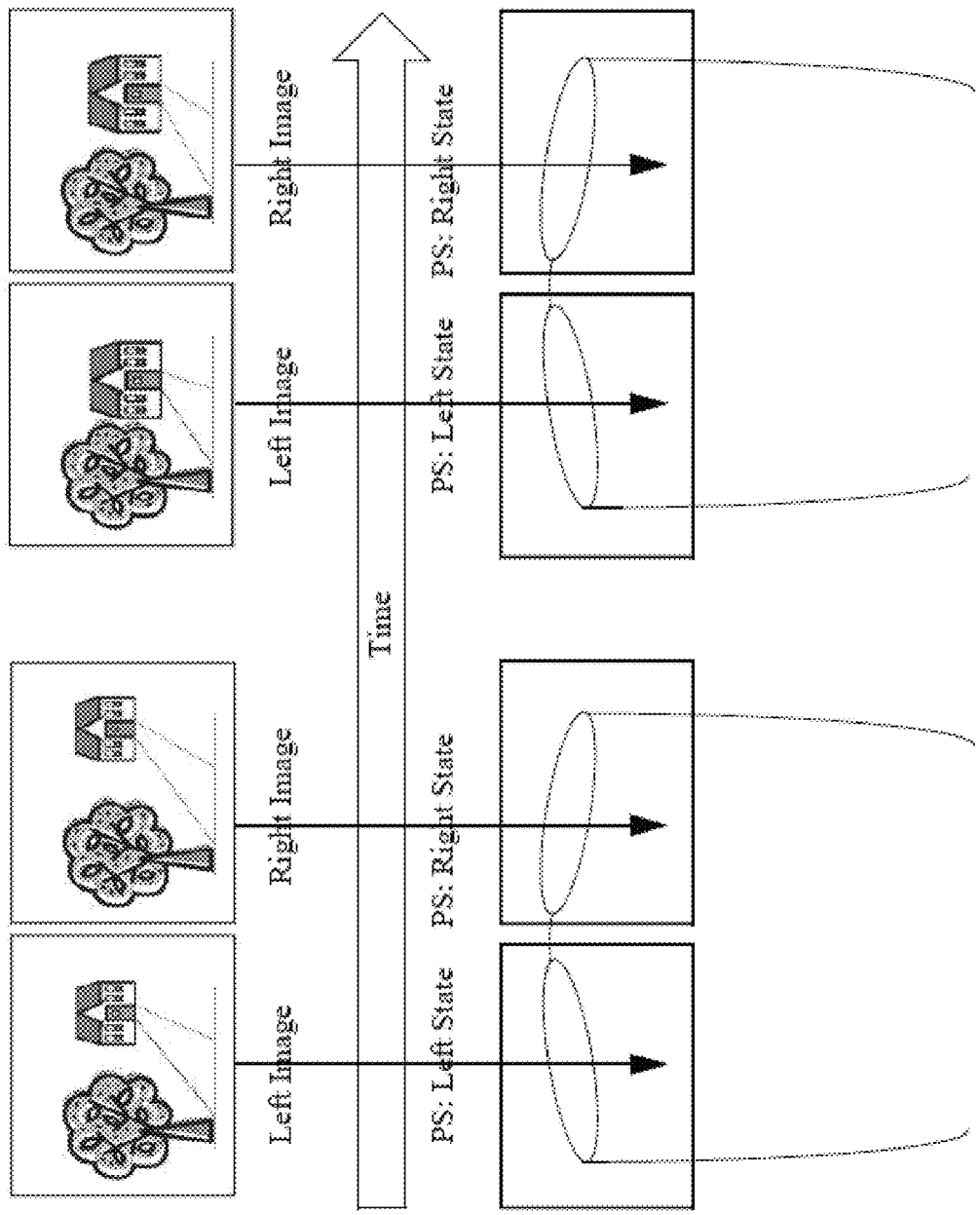
FIG. 3A presents prior art left and right switching views causing a stereoscopic three-dimensional effect.

This allows achievement of the stereo effect shown in FIG. 3A. As may be seen, the top portion of the figure shows the (display) panel switching between a left image and a right image. Synchronous with this, the PS is switching between a Left State and a Right State. These states emit two orthogonal polarization states, as mentioned above. The stereo eyewear is designed such that the left lens will only pass the Left State polarization and the right lens will only pass the Right State polarization. In this way, separation of the right and left images is achieved.

The second conventional architecture uses stereo shutter glasses, which replace the PS and eyewear. In this system, each eye is covered by an optical shutter, which can be either open or closed. Each of these shutters is opened and closed synchronously with the panel display in such a way that when the left image is shown on the display, only the left eye shutter is open, and when the right image is shown on the display, only the right eye shutter is open. In this manner, the left and right views are presented to the user's left and right eyes, respectively.

Figure 3C:
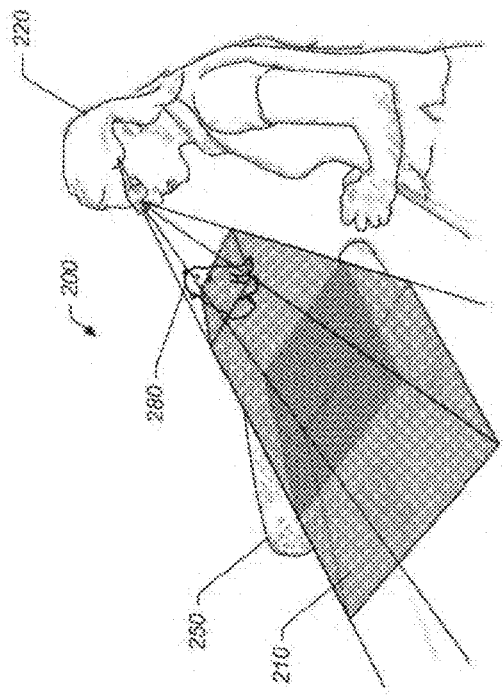
FIGS. 3B, 3C, and 3D present prior art stereoscopic displays.
Figure 3B:
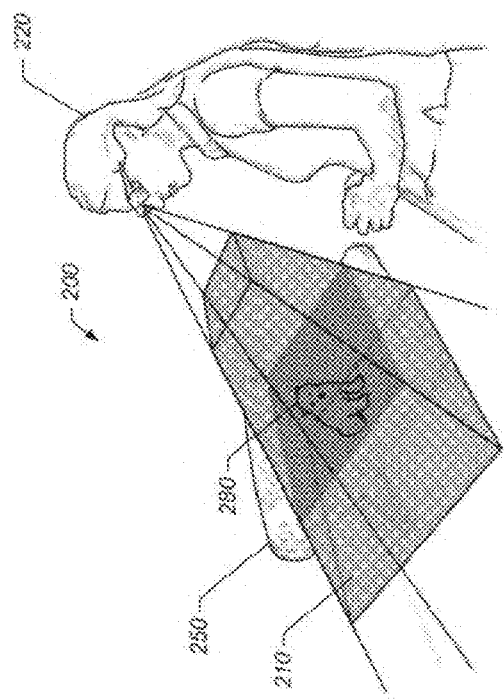

As illustrated in FIG. 3B, in an example embodiment, a three-dimensional stereoscopic display system 200, which may be similar to or the same as system 100 described above, may be configured to display three-dimensional stereoscopic content 280 within a stereo comfort fuse zone 210 using three-dimensional stereoscopic display 250. As used herein, the term stereo comfort fuse zone refers to a physical volume in which the user, such as user 220, of a three-dimensional stereoscopic display can view three-dimensional content, such as content 280, within the human eye's comfortable fusing volume. The stereo comfort fuse zone may extend to both the front of, or above the three-dimensional stereoscopic display 250 and the inner volume (behind, or below the three-dimensional stereoscopic display 250). In such embodiments, a functional unit of display system 200 may be configured to determine the geometry, i.e., the size and shape, of stereo comfort fuse zone 210 of three-dimensional stereoscopic display 250. Note that Stereo comfort fuse zone 210 may include a physical volume that may be specified by the depth of field of user 220 with respect to the position of three-dimensional stereoscopic display 250 and the point of view, or eyepoint, of user 220. Note further that the physical volume of the Stereo comfort fuse zone 220 may correspond to at least a portion of a virtual three-dimensional space that may be displayed or rendered using three-dimensional stereoscopic display system 200. The stereo comfort fuse zone may be further determined by the size of the display, the resolution of the display, the dynamic range and/or contrast ratio of the display, the stereo ghosting characteristics of the display as well as the physiological characteristics of the user.

Figure 3D:
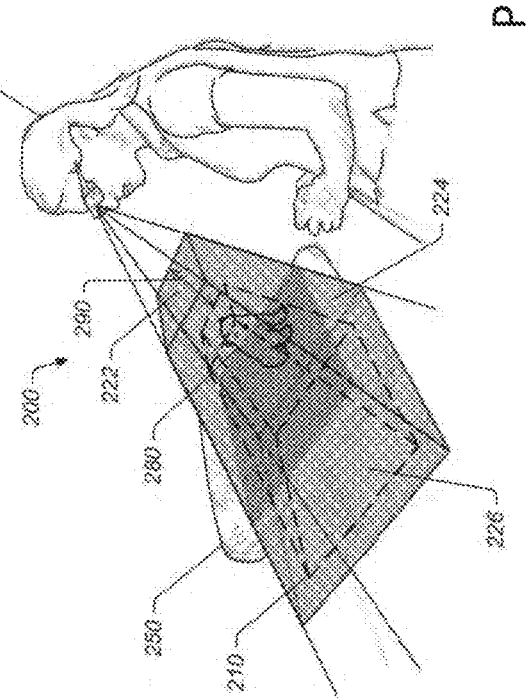

Thus, as shown in FIG. 3B, the functional unit of three-dimensional stereoscopic display system 200 may be configured to display content 280 at a first position in the virtual three-dimensional space relative to the eyepoint, or point of view, of user 220. Note that the first position may correspond to a position within the stereo comfort fuse zone as illustrated. In certain embodiments the functional unit may be configured to determine that content 280, or a portion of content 280, is not contained, or is not completely within, the stereo comfort fuse zone 220 as shown in FIG. 3C. In some embodiments, the functional unit may be configured to determine that the content 280, or a portion of content 280, is within a specified distance, such as distance 290, from a boundary, such as boundaries 222-226 (note that not all boundaries are labeled) of the stereo comfort fuse zone 220 as shown in FIG. 3D.

There are a number of contributors enabling a user to perceive a spatial scene using a mono or stereo display for user viewing. In the stereo display by using two distinct eye-points for capturing a scene to be displayed to a user with alternate left right imagery, a stereo image is produced. However when presenting objects within this imagery, where the objects depending upon the perceptual recognition of spatial variance, by using the disparity between the two images or at least the disparity between images of the objects within the scene, the depth information is presented to the user.

Terms

The following is a list of terms used in the present application:

Memory—may include non-transitory computer readable media, including volatile memory, such as a random access memory (RAM) module, and non-volatile memory, such as a flash memory unit, a read-only memory (ROM), or a magnetic or optical disk drive, or any other type of memory unit or combination thereof. Memory is configured to store any software programs, operating system, drivers, and the like, that facilitate operation of display system, including software applications, rendering engine, spawning module, and touch module.

Display—may include the display surface or surfaces or display planes of any technically feasible display device or system type, including but not limited to the display surface of a light-emitting diode (LED) display, a digital light (DLP) or other projection displays, a liquid crystal display (LCD), optical light emitting diode display (OLED), laser-phosphor display (LPD) and/or a stereo three-dimensional display all arranged as a single stand alone display, head mounted display or as a single or multi-screen tiled array of displays. Display sizes may range from smaller handheld or head mounted display devices to full wall displays, which may or may not include an array of display devices. The display may include a single camera within a mono display device or a dual camera for a stereo display device. The camera system is particularly envisioned on a portable display device, with a handheld, head mounted, or glasses device. The camera(s) would be located within the display device to peer out in the proximity of what the user of the display device might see; that is, facing the opposite direction of the display surface, Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a Memory.

Viewpoint ("perspective")—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes) of a scene seen from a point (or two points) in space. Thus, viewpoint may refer to the view from a single eye, or may refer to the two points of view from a pair of eyes. A "single viewpoint" may specify that the viewpoint refers to only a single point of view and a "dual viewpoint", "paired viewpoint", or "stereoscopic viewpoint" may specify that the viewpoint refers to two points of view (and not one).

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Graphical Processing Unit—refers to a component that may reside on a personal computer, workstation, or equivalent, and outputs video levels for each color or channel of a supported color model, e.g., for each of three colors, typically Red (R), Green (G), and Blue (B), for each pixel on the display. Each of these numbers is typically an 8 bit number, with a range of 0 to 255, although other ranges are possible.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Projection—refers the display of a three-dimensional object, or content, on a two dimensional (2D) rendering presented on a display. Thus, a projection may be described as the mathematical function generally in the form of a function applied to objects within a virtual three-dimensional scene to determine the virtual position, size, and orientation of the objects within a three-dimensional scene that is presented on the three-dimensional stereoscopic display from the perspective of a user.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Example Systems

This specification describes a system that is configured to generate a stereoscopic image pair (referred to herein as a "superior" stereoscopic image pair) of an environment that includes a virtual stereoscopic display. That is, the virtual stereoscopic display is not a real-world, physical display, but is rather a virtual object that represents a stereoscopic display within the environment (referred to herein as a "superior" environment).

In this specification, and as indicated above, a stereoscopic image of an environment that includes a virtual stereoscopic display is called a stereoscopic superior image, while a stereoscopic image that is rendered as being displayed by a virtual stereoscopic display is called an stereoscopic inferior image. In other words, the stereoscopic superior image includes a rendering of the stereoscopic inferior image.

In this specification, an environment that includes a virtual stereoscopic display is called a superior environment, whereas an environment that is represented by an image displayed by a virtual stereoscopic display is called an inferior environment.

In some implementations, the superior environment is or includes a virtual environment, and the virtual stereoscopic display can be one of multiple virtual objects in the virtual superior environment. A user can view the pair of stereoscopic superior images of the superior environment (e.g., using a head-mounted display device) as if the user were in the superior environment.

In some other implementations, the superior environment includes a physical environment, i.e., includes a model or a representation of the physical environment, into which the virtual stereoscopic display can be projected. In these implementations, each stereoscopic superior image of the superior environment can include a rendering of the virtual stereoscopic display projected into the physical environment. That is, the location and orientation of the virtual stereoscopic display can identify a real-world location and orientation in a coordinate system of the physical environment. A user can therefore view the pair of stereoscopic superior images of the physical environment as if the virtual stereoscopic display were a real-world physical display located in the physical environment. In some such implementations, the system obtains an initial pair of stereoscopic superior images of the physical environment captured by one or more cameras in the physical environment, and processes the initial stereoscopic superior image pair to generate a composite stereoscopic superior image pair that includes a depiction of the virtual stereoscopic display.

The virtual stereoscopic display device can represent a single-display device or a dual-display device. The system can maintain data representing the virtual stereoscopic display, which can include data representing a three-dimensional model of the virtual stereoscopic display and data representing a location and orientation within the superior environment (e.g., a coordinate in a three-dimensional coordinate system of the superior environment).

The virtual stereoscopic display is rendered, within each stereoscopic superior image of the superior environment, as displaying a second pair of stereoscopic images, which are stereoscopic inferior images depicting an inferior environment. That is, when viewing the stereoscopic superior images of the environment, a user views a depiction of the virtual stereoscopic display as if the virtual stereoscopic display were displaying the stereoscopic inferior images. For example, the user can view the stereoscopic superior image pair using a physical stereoscopic display device.

The inferior environment (i.e., environment represented by the stereoscopic inferior image pair and displayed by the virtual stereoscopic display device) can be different from or the same as the superior environment (i.e., the environment that includes the virtual stereoscopic display device and that is represented by the stereoscopic superior image pair). For example, each stereoscopic inferior image can be a composite image of the superior environment, i.e., can include a depiction of the superior environment that includes depictions of virtual objects that are not actually in the superior environment (in the case where the superior environment includes a physical environment) or that are not depicted in the superior image of the superior environment (in the case where the superior environment is or includes a virtual environment).

In particular, the stereoscopic inferior image pair is rendered within the stereoscopic superior image pair in stereo; that is, the stereoscopic inferior image pair maintains its three-dimensional quality when rendered in the stereoscopic superior image pair. Therefore, from the perspective of a user viewing the stereoscopic superior image pair using a physical stereoscopic display, the virtual stereoscopic display is displaying the stereoscopic inferior image pair in stereo, and thus the inferior environment represented by the stereoscopic inferior image pair appears to the user to have depth. For example, the user can view, in stereo, three-dimensional objects (e.g., virtual objects and/or real-world physical objects) that are located in the inferior environment and rendered in the stereoscopic inferior image pair. This process is discussed in more detail below with reference to FIG. 4.

In some implementations, the system can continuously generate pairs of stereoscopic superior images of the superior environment and display the stereoscopic superior image pairs for the user in real time, so that it appears, from the perspective of the user, as if the user is within or otherwise viewing the superior environment depicted in the stereoscopic superior image pairs, e.g., the virtual environment or the physical environment that includes the virtual stereoscopic display as projected from the user's perspective. For example, in implementations in which the system generates pairs of composite stereoscopic superior images of a real-world physical environment, the system can continuously obtain pairs of initial stereoscopic superior images of the physical superior environment from cameras within the physical superior environment to generate the pairs of composite stereoscopic superior images.

In some implementations, a pointer can be used by a user to interact with the virtual stereoscopic display. For example, the user can use the pointer to move the virtual stereoscopic display within the superior environment, i.e., to change the location and/or orientation of the stereoscopic display in the three-dimensional coordinate system of the superior environment. As another example, the user can use the pointer to interact with a user interface of the virtual stereoscopic display as if the virtual stereoscopic display were a real-world physical display, e.g., by selecting graphical elements displayed on the virtual stereoscopic display or by interacting with hardware components (e.g., buttons, knobs, dials, etc.) that are modeled on the virtual stereoscopic display.

In some such implementations, the pointer is passive and the position of the pointer is tracked, e.g., by a camera. In these implementations, the pointer could be a stylus, a finger, or a thimble. In some other such implementations, the pointer is an active pointing device; i.e., the system includes a pointing device equipped with active tracking components, e.g., radio-frequency (RF) transceivers, accelerometers, gyros and/or infrared (IR) sources, that aid with tracking the pointing device. For example, the pointing device can be a stylus with a tracking component, or a stylus with an attached camera. The system can track the pointer to determine the location/orientation of the pointer (e.g., a 6 degrees-of-freedom point in the three-dimensional coordinate system of the superior environment) as well as interactions between the pointer and the virtual stereoscopic display.

Figure 4:
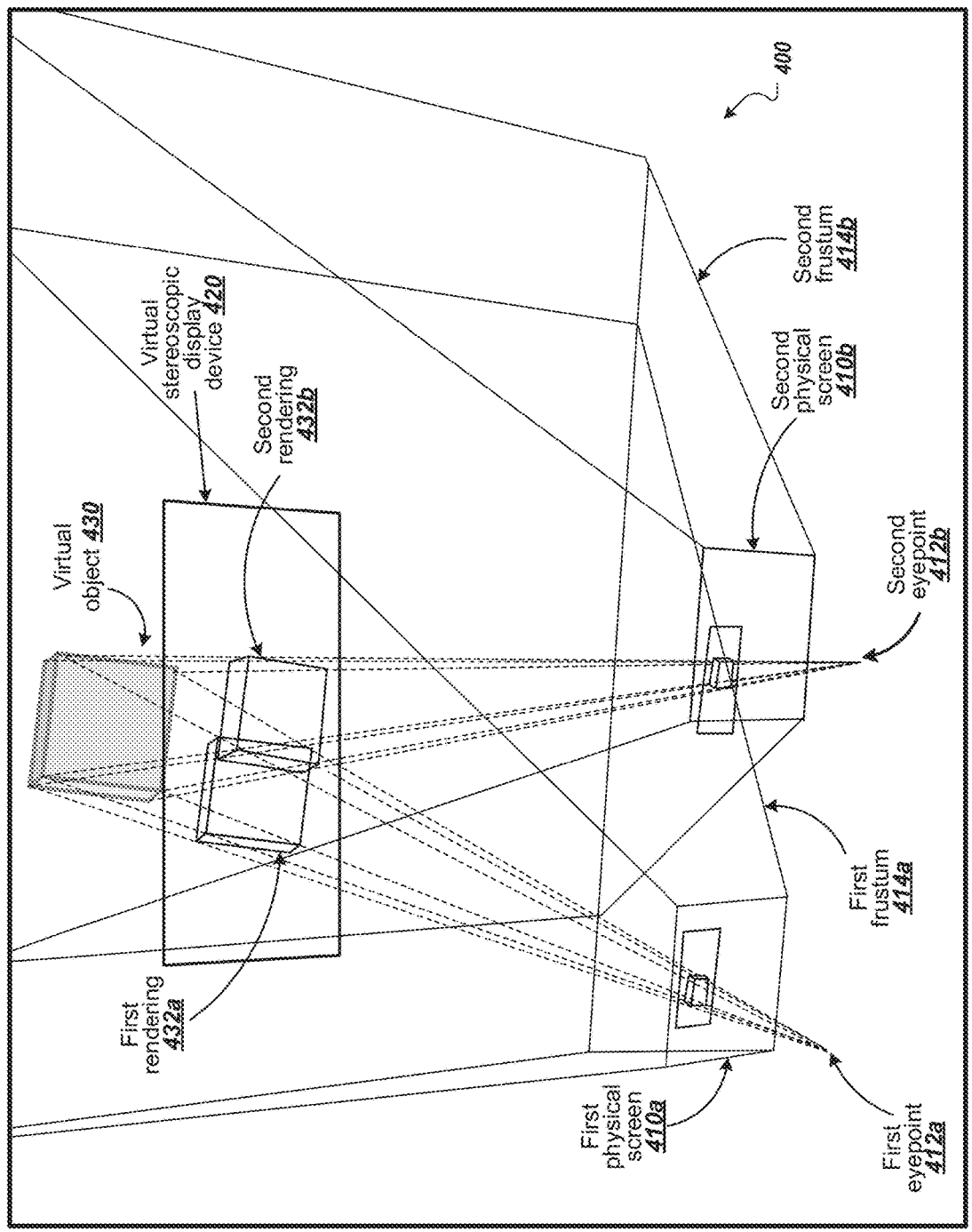
FIG. 4 presents an example system with nested stereoscopic displays.

FIG. 4 illustrates an example system that may be configured to perform various embodiments described below. FIG. 4 shows an example superior environment 400 that includes a virtual stereoscopic display device 420. As described above, the superior environment 400 can include one or more of a physical environment or a virtual environment.

A user can view pairs of stereoscopic superior images of the superior environment 400 using a physical stereoscopic display device. Generally, the physical stereoscopic display device can be any device that is configured to display stereoscopic images. For example, the physical stereoscopic display device can include a single screen that has an alternating polarizer which changes polarization between a left-eye view and a right-eye view such that a user can wear passive polarized glasses that enable the user to view the stereoscopic superior image pair. As another example, the physical stereoscopic display device can include shutter glasses, as described above. As another example, the physical stereoscopic display device can include a head mounted display or goggles, where each eye is shown a distinct image, as described above.

As depicted in FIG. 4, the physical stereoscopic display device includes two physical screens 410a-b. The first physical screen 410a corresponds to a first eyepoint 412a of the user (e.g., the eyepoint of the left eye of the user) and the second physical screen 410b corresponds to a second eyepoint 412b of the user (e.g., the eyepoint of the right eye of the user). The distance between the first physical screen 410a and the second physical screen 410b can correlate to the separation between the two eyes of the user (known as the "interocular distance" or "interpupillary distance"), with the separation distance taken into account when generating the two user perspective-based images.

For example, the physical stereoscopic display device can be a head-mounted display that displays respective images of the superior environment 400 to each eye of the user. As another example, in implementations in which the superior environment 400 includes a physical environment, the physical stereoscopic display device can be a pair of "augmented reality glasses" through which the user can directly view the superior environment 400 merged with one or more virtual objects, e.g., a physical display device that includes transparent lenses or displays that are configured to display composite images of the environment. For example, the physical stereoscopic display device can include two transparent, or partially transparent, lenses through which the user can view the superior environment 400 and onto which the device can project renderings of virtual objects so that it appears, from the perspective of the user, that the virtual objects are in the physical superior environment 400. For example, the physical stereoscopic display device can use a laser projector or some other light-based projection system to project the renderings of the virtual objects onto the transparent lenses.

A system of one or more computers located in one or more locations, e.g., an image processing system, can generate a pair of stereoscopic superior images of the superior environment that the physical stereoscopic display device can display on the screens 410a-b. In particular, the system is configured to generate an stereoscopic inferior image pair that, when rendered in the stereoscopic superior image pair of the superior environment 400, appears to be displayed on the virtual stereoscopic display device 420.

In some implementations, the system is on-site, e.g. in the same room as the user of the physical stereoscopic display device. In some other implementations, the system is at least partially in the cloud, i.e., off-site. In some other implementations, the system is additionally or alternatively at least partially a component of the physical stereoscopic display device.

The stereoscopic inferior image pair depicts an inferior environment that can be viewed using the virtual stereoscopic display device 420. The inferior environment includes a virtual object 430 that is not in the superior environment 400, but rather is rendered in the stereoscopic inferior image pair and displayed on the virtual stereoscopic display device 420; the virtual object 430 is depicted in FIG. 4 for illustrative purposes.

The pair of stereoscopic superior images of the superior environment 400 includes two images of the superior environment 400 corresponding to respective eyepoints 412a-b. Each eyepoint 412a-b views the superior environment 400 from a different perspective, and therefore the two images of the superior environment will generally be distinct from each other.

The perspectives of the two eyepoints 412a-b can be defined by respective frustums 414a-b. In some implementations, when generating the superior and/or inferior stereoscopic image pair, the system generates three-dimensional models of the frustums 414a-b in the three-dimensional coordinate system of the superior environment 400, e.g., using the location and orientation of the eyepoints 412a-b in the superior environment 400. The frustums 412a-b can include respective render surfaces for rendering the stereoscopic superior image pair, e.g., render surfaces that correspond to, or are incident to, the physical screens 410a-b and onto which the system projects the objects in the superior environment 400 to generate the stereoscopic superior image pair.

The system can maintain data identifying the respective location and orientation of each of the eyepoints 412a-b in the three-dimensional coordinate system of the superior environment 400. For example, the system can maintain a mapping between i) the location and orientation of the physical stereoscopic display device within the superior environment 400 and ii) the respective location and orientation of each of the eyepoints 412a-b. The system can then track the location and orientation of the physical stereoscopic display device, and determine the corresponding location and orientation of each of the eyepoints 412a-n using the mapping.

In implementations in which the superior environment 400 includes a physical environment, the system can track the location and orientation of the physical stereoscopic display device in the three-dimensional coordinate system of the superior environment 400. In implementations in which the superior environment 400 is or includes a virtual environment, the system can maintain a mapping between the three-dimensional coordinate system of the virtual environment (e.g., the virtual environment 400 itself) and a three-dimensional coordinate system of the physical environment of the user, such that each point in the physical environment of the user maps to a point in the virtual superior environment 400, or vice versa. The system can then track the location and orientation of the physical stereoscopic display device in the coordinate system of physical environment of the user, and determine the corresponding location and orientation in the coordinate system of the virtual superior environment 400 using the maintained mapping.

To track the location and orientation of the physical stereoscopic display device in the three-dimensional coordinate system of a physical environment (e.g., the superior environment 400), the system can obtain tracking data from a tracking component of the physical stereoscopic display device that is configured to determine the location and orientation of the physical stereoscopic display device within its environment.

In some implementations, the tracking component can execute local tracking; i.e., the tracking component can each determine the position of the physical stereoscopic display device in an internal three-dimensional coordinate system, independently of any other object in the physical environment.

Instead or in addition, the tracking component can execute global tracking; i.e., the tracking component can be a component of a central system that tracks the position of multiple different objects in the physical environment in a common coordinate system. For example, the tracking component can interact with a tracking base station, which is a master tracking device that allows the location of every object in the physical environment that has a tracking component to be determined. Using the tracking component, the location and orientation of the physical stereoscopic display device can be determined continuously in real-time.

The tracking component can have multiple photosensors or other tracking mechanisms (e.g. RFID) that are separated by a distance.

In some implementations, the tracking base station emits a radiation signal, e.g. a wavelength of light. Each sensor in the tracking component can reflect the radiation signal back to the tracking base station. The tracking base station can use the multiple returned radiation signals to determine the location and orientation of the physical stereoscopic display device. For example, the tracking base station can determine the 6 degrees of freedom of the physical stereoscopic display device, e.g., the x-position, y-position, z-position, pitch, yaw, and roll of the physical stereoscopic display device in a common three-dimensional coordinate system of the physical environment. The tracking base station can repeatedly perform this process in order to determine the location and orientation of the physical stereoscopic display device continuously in real-time.

In some other implementations, the tracking base station can emit a first radiation signal and a second radiation signal concurrently, e.g., if the tracking base station includes two emitters that are physically separated by a distance. Each sensor in the tracking component can detect the first radiation signal and the second radiation signal at respective detection times, and the tracking component can use the respective detection times of each of the photosensors to determine the position and orientation of the physical stereoscopic display device in real time.

In some other implementations, the tracking base station includes multiple cameras capturing images of the physical environment. The tracking base station can perform object recognition on the captured images, and determine the location and orientation of the physical stereoscopic display device as recognized in the captured images.

The system can also maintain the respective location and orientation of each virtual object in the superior environment 400, including the virtual stereoscopic display device 420. For example, the system can maintain data characterizing a model of the virtual stereoscopic display device 420. The model can identify a shape and size of the virtual stereoscopic display device 420 within a virtual model space. The model can have associated data that identifies the location and orientation of the virtual stereoscopic display device 420 in the three-dimensional coordinate system of the superior environment 400. For example, the associated data can define the location and orientation of the virtual stereoscopic display device 420 in six dimensions: three dimensions defining the location of the virtual stereoscopic display device 420 (e.g., x, y, and z) and three dimensions defining the orientation of the virtual stereoscopic display device 420 (e.g. pitch, yaw, and roll).

As a particular example, the system can maintain data characterizing a location and orientation of the virtual stereoscopic display device 420 in a virtual model coordinate system that is different from the coordinate system of the superior environment 400. The system can also maintain a mapping from the virtual model coordinate system to the coordinate system of the superior environment 400; that is, each point in the virtual model coordinate system can have a corresponding point in the coordinate system of the superior environment 400. For example, the origin of the virtual model coordinate system can be defined by the virtual stereoscopic display device 420. Therefore, if the virtual stereoscopic display device 420 is moved (e.g., if a user moves the virtual stereoscopic display device 420 to a different location in the superior environment 400), the implied location and orientation of the virtual stereoscopic display device 420 in the coordinate system of the superior environment 400 can be updated accordingly.

Using the respective location and orientation of each eyepoint 412*a-b* and the virtual stereoscopic display device 420, the system can generate the pair of inferior stereoscopic images of the inferior environment that includes the virtual object 430.

The system can translate the respective location and orientation of each eyepoint 412*a-b* into a three-dimensional coordinate system of the inferior environment. For example, the system can maintain a mapping between the coordinate system of the superior environment 400 and the coordinate system of the inferior environment, e.g., in the form of rotation and translation matrices. As a particular example, the system can maintain a translation rotation matrix that, when applied to points in the coordinate system of the superior environment 400, projects the points into the coordinate system of the inferior environment. The system can then process the locations and orientations of the eyepoints 412*a-b* according to the mapping to project the eyepoints 412*a-b* into the coordinate system of the inferior environment.

In some implementations, the superior environment 400 and the inferior environment have the same coordinate system (e.g., when the virtual stereoscopic display device 420 represents an "augmented reality" device, as described above). In these implementations, the location and orientation of the eyepoint pair 412*a-b* (and every other object) is the same in the superior environment and the inferior environment.

Using determined the location and orientation of the eyepoints 412*a-b* in the inferior environment, the system can generate a second pair of frustums that can be used to generate the pair of inferior stereoscopic images of the inferior environment. The second pair of frustums can include respective render surfaces for rendering the inferior stereoscopic image pair, i.e., render surfaces onto which the system projects the objects in the inferior environment to generate the inferior stereoscopic image pair. For example, the render surfaces of the inferior frustums can be incident to the virtual stereoscopic display device 420, where the location and orientation of the virtual stereoscopic display device 420 in the inferior environment can be determined using a mapping between the respective coordinate systems of the inferior and superior environments, as described above. As a particular example, the bounded near plane of the inferior frustums can be defined by the edges of the virtual stereoscopic display device 420. For clarity, the second pair of frustums are called "inferior" frustums. In other words, the inferior frustums can depend on the relative positions of the eyepoints 412*a-b* and the virtual stereoscopic display device 420.

Then, for each image in the inferior stereoscopic image pair, the system can project the virtual objects in the inferior environment onto the respective render surface of the corresponding inferior frustum. In particular, the system can generate a first rendering 432*a* of the virtual object 430 by projecting the virtual object 430 onto a render surface of the first inferior frustum (corresponding to the first eyepoint 412*a*), and a second rendering 432*b* of the virtual object 430 by projecting the virtual object 430 onto the render surface of the second inferior frustum (corresponding to the second eyepoint 412*b*). The respective render surfaces of the inferior frustums can be defined according to the angle between the corresponding eyepoints 412*a-b* and the virtual stereoscopic display device 420 in the superior environment 400.

Having generated the pair of inferior stereoscopic images of the inferior environment, the system can generate the pair of stereoscopic superior images of the superior environment 400. In particular, for each eyepoint 412*a-b*, the system can generate an image of the stereoscopic superior image pair using the corresponding image of the inferior stereoscopic image pair. In other words, the system can use the "left eye" inferior image to generate the "left eye" superior image, and the "right eye" inferior image to generate the "right eye" superior image. Therefore, from the user's perspective (i.e., the perspective of the eyepoints 412*a-b*), the inferior image is displayed stereoscopically by the virtual stereoscopic display device 420.

In some implementations, the system can use the pair of generated inferior stereoscopic images as textures for the virtual stereoscopic display device, e.g., for a portion of the virtual stereoscopic display device that represents a display. That is, when generating the stereoscopic superior image pair, the system can treat the stereoscopic inferior image pair as a texture for the virtual model of the virtual stereoscopic display device, as it would for a standard texture for a virtual model. For example, the system can texture map the stereoscopic inferior images onto one or more polygons representing the display of the virtual stereoscopic display device.

In particular, when generating the image of the stereoscopic superior image pair corresponding to the first eyepoint 412a, the system can use the image of the stereoscopic inferior image pair corresponding to the first eyepoint 412a as the texture for the virtual stereoscopic display device. Similarly, when generating the image of the stereoscopic superior image pair corresponding to the second eyepoint 412b, the system can use the image of the stereoscopic inferior image pair corresponding to the second eyepoint 412b as the texture for the virtual stereoscopic display device. Thus, the image of the stereoscopic superior image pair corresponding to a respective eyepoint 412a-b only includes a rendering of the image of the stereoscopic inferior image pair that also corresponds to the respective eyepoint 412a-b, and therefore each eye of the user only sees the image of the stereoscopic inferior image pair that corresponds to that eye.

The system can then communicate the data representing the rendered stereoscopic superior images to the physical stereoscopic display device, which can then project the stereoscopic superior images onto the physical screens 410a-b for display to the user.

In some implementations, the operations for generating the stereoscopic superior image pair can be parallelized across multiple different computers or computer systems. For example, a first computer system can generate the stereoscopic inferior image pair while a second computer system generates the stereoscopic superior image pair (or, a portion of the stereoscopic superior image pair that does not include the rendering of the virtual stereoscopic display device 420). When the first computer system finishes generating the stereoscopic inferior image pair, the first computer system can provide the stereoscopic inferior image pair to the second computer system, which can use the stereoscopic inferior image pair to finish generating the stereoscopic superior image pair as described above.

In some implementations, the inferior environment can include a second virtual stereoscopic display device that is rendered as displaying stereoscopic images of a second inferior environment. That is, the inferior environment acts as the superior environment for the second inferior environment. In these implementations, the system can generate the stereoscopic image pair of the second inferior environment, and use the stereoscopic image pair of the second inferior environment to generate the stereoscopic image pair of the first inferior environment, as described above. Generally, the process described above can be iteratively chained any number of times, such that each inferior environment includes a virtual stereoscopic display device that displays another inferior environment.

Example Processes

Figure 5:
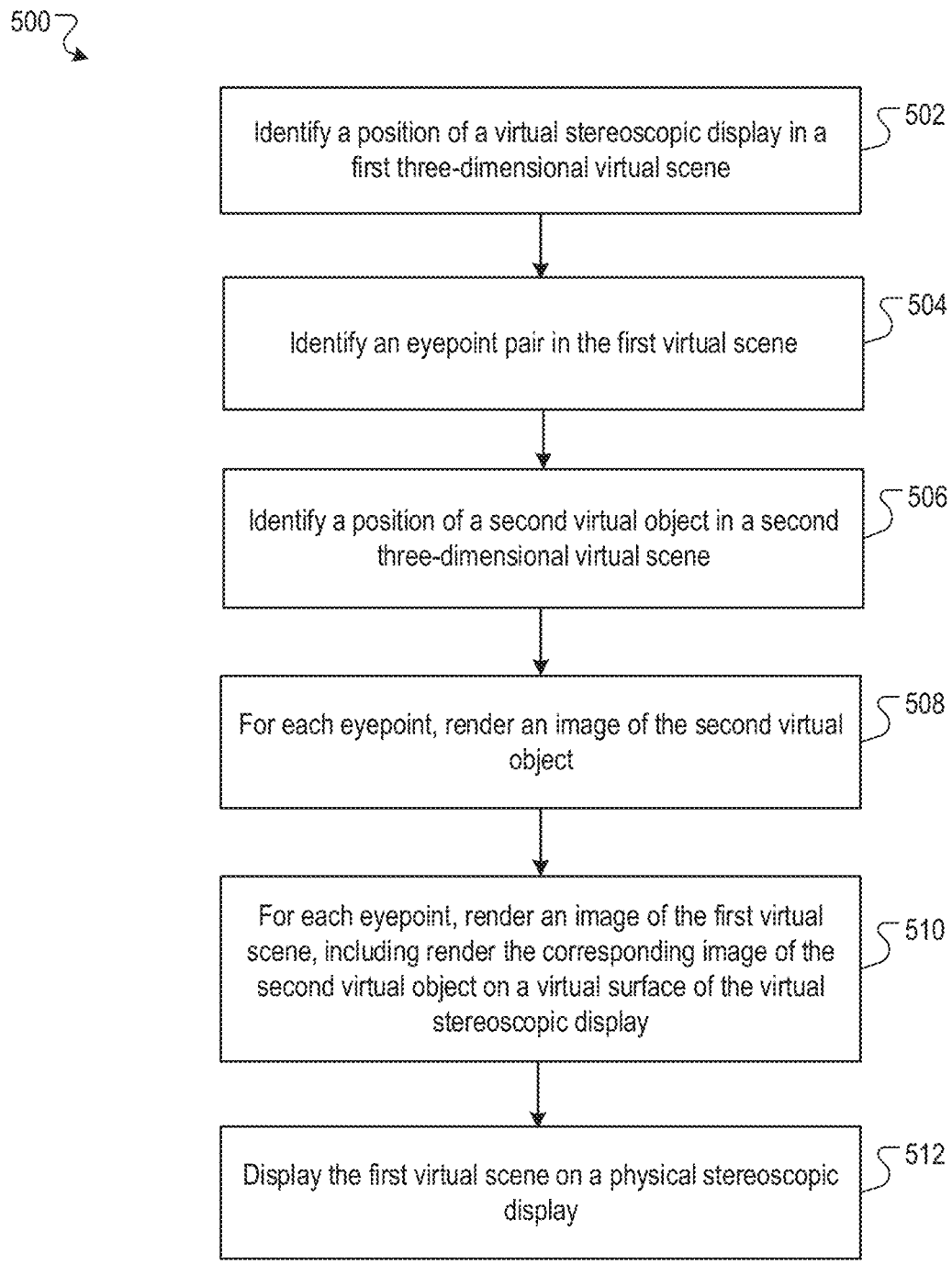
FIG. 5 is a flow diagram of an example process for generating a pair of stereoscopic superior images.

FIG. 5 is a flow diagram of an example process 500 for generating a pair of stereoscopic superior images. For convenience, the process 500 will be described as being performed by a system of one or more computers located in one or more locations. For example, an image processing system appropriately programmed in accordance with this specification can perform the process 500.

The system identifies a position of a virtual stereoscopic display in a first, superior three-dimensional virtual environment (step 502). The position can include a location and orientation of the virtual stereoscopic display in a three-dimensional coordinate system of the superior virtual environment. The position can also include a spatial composition of the virtual stereoscopic display, e.g., a dimensionality, shape, and/or three-dimensional model of the virtual stereoscopic display. In some implementations, the superior virtual environment includes multiple virtual objects, including the virtual stereoscopic display.

The virtual stereoscopic display can include a virtual surface, e.g., a two-dimensional virtual surface on which stereoscopic images can be projected. In some implementations, the virtual surface is flat; in some other implementations, the virtual surface is concave.

The system identifies an eyepoint pair in the superior virtual environment (step 504). For each eyepoint, a first three-dimensional frustum can identify a position and orientation, in the coordinate system of the superior virtual environment, of a render surface.

The system identifies a position of a second virtual object in a second, inferior three-dimensional virtual environment (step 506). The position can include a location and orientation of the second virtual object in a three-dimensional coordinate system of the inferior virtual environment. In some implementations, the inferior virtual environment includes multiple virtual objects, including the second virtual object. The position can also include a spatial composition of the second virtual object, e.g., a dimensionality, shape, and/or three-dimensional model of the second virtual object.

The system renders, for each eyepoint of the eyepoint pair, an image of the second virtual object (step 508). The system can render the images of the second virtual object using i) the second virtual object's location and orientation in the coordinate system of the inferior virtual environment and ii) the virtual stereoscopic display's location and orientation in the coordinate system of the superior virtual environment.

Rendering the images of the second virtual object can include determining, using i) the first three-dimensional frustum and ii) the location and orientation of the virtual stereoscopic display in the coordinate system of the superior environment, a second three-dimensional frustum for each eyepoint. The second three-dimensional frustum can identify a position and orientation, in the coordinate system of the inferior environment, of a second render surface.

The system renders, for each eyepoint, an image of the superior virtual environment, including rendering the corresponding image of the second virtual object on the virtual surface of the virtual stereoscopic display (step 510). For example, the system can texture map the image of the second virtual object onto a polygon that represents the virtual surface. In some implementations, the superior virtual environment is rendered by a first processor and the inferior virtual environment is rendered by a different second processor.

The system displays the superior virtual environment on a physical stereoscopic display (step 512).

Figure 6:
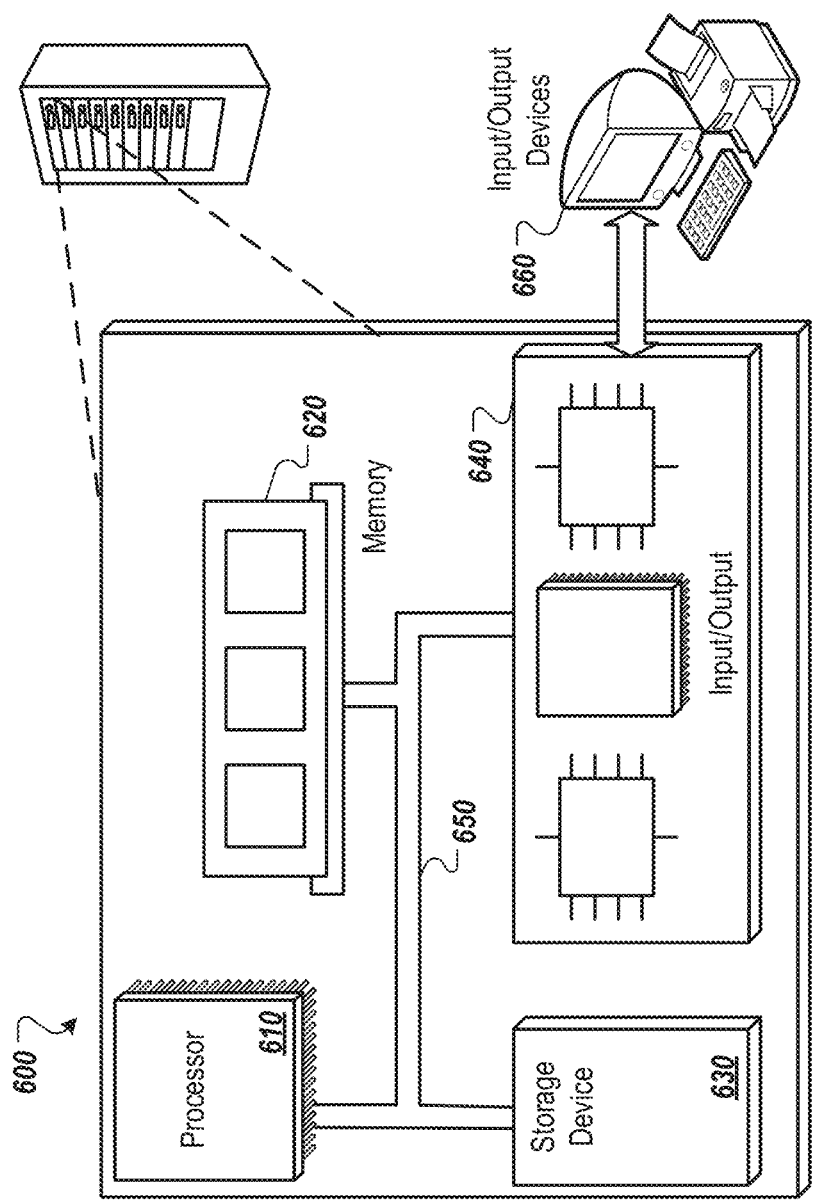
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (for example, a cloud storage device), or some other large capacity storage device.

The input/output device 640 provides input/output operations for the system 600. In one implementation, the input/output device 640 can include one or more network interface devices, for example, an Ethernet card, a serial communication device, for example, a RS-232 port, and/or a wireless interface device, for example, a 802.11 card. In another implementation, the input/output device can include driver devices configured to receive input data and send output data to other input/output devices, for example, keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

It should be noted that the above-described embodiments are only examples, and are not intended to limit the invention to any particular form, function, or appearance. Moreover, in further embodiments, any of the above features may be used in any combinations desired. In other words, any features disclosed above with respect to one method or system may be incorporated or implemented in embodiments of any of the other methods or systems.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a computer program product, tangibly embodied in a non-transitory computer readable medium, comprising instructions to cause one or more processors to:

identify, in a first three-dimensional coordinate system of a first three-dimensional virtual environment, a location and orientation of a first virtual object that is a virtual stereoscopic display object, wherein the virtual stereoscopic display object includes a virtual surface;

identify an eyepoint pair in the first virtual environment;

identify, in a second three-dimensional coordinate system of a second three-dimensional virtual environment, a location and orientation of a second virtual object that is in the second virtual environment;

for each eyepoint of the eyepoint pair, render an inferior image of the second virtual object based on i) the second virtual object's location and orientation in the second coordinate system and ii) the virtual stereoscopic display object's location and orientation in the first coordinate system;

for each eyepoint of the eyepoint pair, render a superior image of the first virtual environment, comprising rendering, in the superior image for each eyepoint, the corresponding inferior image onto the virtual surface of the virtual stereoscopic display object; and display, on a physical stereoscopic display, the first virtual environment.

Embodiment 2 is the computer program product of embodiment 1, wherein the first virtual environment includes a plurality of first virtual objects, wherein the plurality of first virtual objects includes the virtual stereoscopic display object.

Embodiment 3 is the computer program product of any one of embodiments 1 or 2, wherein the second virtual environment includes a plurality of second virtual objects.

Embodiment 4 is the computer program product of any one of embodiments 1-3, wherein, for each eyepoint, a first three-dimensional frustum identifies a position and orientation, in the first coordinate system, of a render surface.

Embodiment 5 is the computer program product of any one of embodiments 1-4, wherein:

the instructions to identify the eyepoint pair in the first virtual environment comprise instructions to identify, in the first coordinate system of the first virtual environment, a location and orientation of the eyepoint pair; and the instructions to render the inferior images of the second virtual object comprise instructions to determine, using the eyepoint pair's location and orientation in the first coordinate system, a corresponding location and orientation in the second coordinate system of the second virtual environment.

Embodiment 6 is the computer program product of any one of embodiments 1-5, wherein the instructions to render the inferior images of the second virtual object comprise instructions to determine, using the location and orientation of the virtual stereoscopic display object in the first coordinate system, a second three-dimensional frustum for each eyepoint.

Embodiment 7 is the computer program product of embodiment 6, wherein, for each eyepoint, the second three-dimensional frustum identifies a position and orientation, in the second coordinate system, of a second render surface.

Embodiment 8 is the computer program product of any one of embodiments 1-7, wherein the first virtual environment is rendered by a first processor of the one or more processors and the second virtual environment is rendered by a different second processor of the one or more processors.

Embodiment 9 is the computer program product of any one of embodiments 1-8, wherein the instructions to render, in the superior image of each eyepoint, the corresponding inferior image on the virtual surface of the virtual stereoscopic display object include instructions to texture map the corresponding inferior image onto a polygon that represents the virtual surface.

Embodiment 10 is the computer program product of any one of embodiments 1-9, wherein:

the instructions to identify a location and orientation of the virtual stereoscopic display object comprise instructions to identify a spatial composition of the virtual stereoscopic display object; and the instructions to identify a location and orientation of the second virtual object comprise instructions to identify a spatial composition of the second virtual object;

Embodiment 11 is the computer program product of any one of embodiments 1-10, wherein:

the virtual stereoscopic display object is a first virtual stereoscopic display object;

the second virtual object is a second virtual stereoscopic display object that includes a second virtual surface;

the inferior images of the second virtual object are first inferior images; and the computer program product further comprises instructions to:

identify, in a third three-dimensional coordinate system of a third three-dimensional virtual environment, a location and orientation of a third virtual object; and for each eyepoint of the eyepoint pair, render a second inferior image of the third virtual object based on i) the third virtual object's location and orientation in the third coordinate system, ii) the first virtual stereoscopic display object's location and orientation in the first coordinate system, and iii) the second virtual stereoscopic display object's location and orientation in the second coordinate system; and the instructions to render, for each eyepoint, the first inferior image include instructions to render, in the first inferior image for each eyepoint, the corresponding second inferior image onto the second virtual surface of the second virtual stereoscopic display object.

Embodiment 12 is a method comprising the operations of any one of embodiments 1 to 11.

Embodiment 13 is a system comprising one or more computers and one or more storage devices storing instructions that are operable, when executed by the one or more computers, to cause the one or more computers to perform the operations of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer program product, tangibly embodied in a non-transitory computer readable medium, comprising instructions to cause one or more processors to:

identify, in a first three-dimensional coordinate system of a first three-dimensional virtual environment, a location and orientation of a virtual object that includes a virtual surface;

identify an eyepoint pair in the first virtual environment, comprising identifying, for each eyepoint of the eyepoint pair, a first location and first orientation of the eyepoint in the first coordinate system of the first virtual environment, wherein, for each eyepoint of the eyepoint pair, the respective first location and first orientation of the eyepoint define a respective different perspective of the first virtual environment from which a user can view the first virtual environment using a physical stereoscopic display;

identify a relationship between (i) the first coordinate system of the first virtual environment and (ii) a second coordinate system of a second virtual environment, wherein the relationship is defined according to the location and orientation of the virtual object in the first coordinate system of the first virtual environment;

for each eyepoint of the eyepoint pair, determine, using the identified relationship, a respective different perspective of the second virtual environment from which the user can view the second virtual environment using the virtual surface of the virtual object;

for each particular eyepoint of the eyepoint pair, render an image of the first virtual environment, wherein the image for each particular eyepoint includes a respective different rendering, on the virtual surface of the virtual object, of the second virtual environment according to the respective different perspective of the second virtual environment for the particular eyepoint; and display, on the physical stereoscopic display, the images of the first virtual environment.

2. The computer program product of claim 1, wherein the first virtual environment includes a plurality of different virtual objects.

3. The computer program product of claim 1, wherein the second virtual environment includes a plurality of second virtual objects.

4. The computer program product of claim 1, wherein, for each eyepoint, a first three-dimensional frustum identifies a location and orientation, in the first coordinate system, of a render surface.

5. The computer program product of claim 1, wherein the instructions to render, for each eyepoint of the eyepoint pair, an image of the first virtual environment comprise instructions to determine, for each particular eyepoint of the eyepoint pair and using the respective different perspective of the second virtual environment for the particular eyepoint, a respective second three-dimensional frustum that identifies a location and orientation, in the second coordinate system, of a second render surface.

6. The computer program product of claim 5, wherein, for each eyepoint of the eyepoint pair, the second render surface of the second three-dimensional frustum corresponding to the eyepoint is incident to the virtual surface of the virtual object, when the second render surface is projected into the first coordinate system according to the identified relationship between the first coordinate system of the first virtual environment and the second coordinate system of the second virtual environment.

7. The computer program product of claim 1, wherein the renderings of the second virtual environment are rendered by a first processor of the one or more processors and the images of the first virtual environment are rendered by a different second processor of the one or more processors.

8. The computer program product of claim 1, wherein, for each eyepoint of the eyepoint pair, the instructions to render an image of the first virtual environment include instructions to texture map the respective rendering of the second virtual environment onto a polygon that represents the virtual surface of the virtual object.

9. The computer program product of claim 1, wherein an origin of the second coordinate system of the second virtual environment is defined using the location and orientation of the virtual object in the first coordinate system of the first virtual environment.

10. The computer program product of claim 1, wherein the relationship between the first coordinate system of the first virtual environment and the second coordinate system of the second virtual environment is defined by a translation-rotation matrix.

11. The computer program product of claim 1, wherein:
the virtual object is a first virtual object;
the images of the first virtual environment are first images; and
the computer program product further comprises instructions to:

identify, in the second coordinate system of the second virtual environment, a location and orientation of a second virtual object that includes a second virtual surface;

identify a relationship between (i) the second coordinate system of the second virtual environment and (ii) a third coordinate system of a third virtual environment, wherein the relationship is defined according to the location and orientation of the second virtual object in the second coordinate system of the second virtual environment; and for each eyepoint of the eyepoint pair, determine, using the identified relationship, a respective different perspective of the third virtual environment from which the user can view the third virtual environment using the second virtual surface of the second virtual object, wherein, for each particular eyepoint of the eyepoint pair, the respective rendering of the second virtual environment includes a respective different rendering, on the second virtual surface of the second virtual object, of the third virtual environment according to the respective different perspective of the third virtual environment for the particular eyepoint.

12. A system comprising one or more computers and one or more storage devices storing instructions that are operable, when executed by the one or more computers, to cause the one or more computers to perform operations comprising:

identifying, in a first three-dimensional coordinate system of a first three-dimensional virtual environment, a location and orientation of a virtual object that includes a virtual surface;

identifying an eyepoint pair in the first virtual environment, comprising identifying, for each eyepoint of the eyepoint pair, a first location and first orientation of the eyepoint in the first coordinate system of the first virtual environment, wherein, for each eyepoint of the eyepoint pair, the respective first location and first orientation of the eyepoint define a respective different perspective of the first virtual environment from which a user can view the first virtual environment using a physical stereoscopic display;

identifying a relationship between (i) the first coordinate system of the first virtual environment and (ii) a second coordinate system of a second virtual environment, wherein the relationship is defined according to the location and orientation of the virtual object in the first coordinate system of the first virtual environment;

for each eyepoint of the eyepoint pair, determining, using the identified relationship, a respective different perspective of the second virtual environment from which the user can view the second virtual environment using the virtual surface of the virtual object;

for each particular eyepoint of the eyepoint pair, rendering an image of the first virtual environment, wherein the image for each particular eyepoint includes a respective different rendering, on the virtual surface of the virtual object, of the second virtual environment according to the respective different perspective of the second virtual environment for the particular eyepoint; and displaying, on the physical stereoscopic display, the images of the first virtual environment.

13. The system of claim 12, wherein the first virtual environment includes a plurality of different virtual objects.

14. The system of claim 12, wherein the second virtual environment includes a plurality of second virtual objects.

15. The system of claim 12, wherein, for each eyepoint, a first three-dimensional frustum identifies a location and orientation, in the first coordinate system, of a render surface.

16. The system of claim 12, wherein rendering, for each eyepoint of the eyepoint pair, an image of the first virtual environment comprises determining, for each particular eyepoint of the eyepoint pair and using the respective different perspective of the second virtual environment for the particular eyepoint, a respective second three-dimensional frustum that identifies a location and orientation, in the second coordinate system, of a second render surface.

17. The system of claim 16, wherein, for each eyepoint of the eyepoint pair, the second render surface of the second three-dimensional frustum corresponding to the eyepoint is incident to the virtual surface of the virtual object, when the second render surface is projected into the first coordinate system according to the identified relationship between the first coordinate system of the first virtual environment and the second coordinate system of the second virtual environment.

18. The system of claim 12, wherein the renderings of the second virtual environment are rendered by a first processor of the one or more processors and the images of the first virtual environment are rendered by a different second processor of the one or more processors.

19. The system of claim 12, wherein, for each eyepoint of the eyepoint pair, rendering an image of the first virtual environment comprises texture mapping the respective rendering of the second virtual environment onto a polygon that represents the virtual surface of the virtual object.

20. The system of claim 12, wherein an origin of the second coordinate system of the second virtual environment is defined using the location and orientation of the virtual object in the first coordinate system of the first virtual environment.

21. The system of claim 12, wherein the relationship between the first coordinate system of the first virtual environment and the second coordinate system of the second virtual environment is defined by a translation-rotation matrix.

22. The system of claim 12, wherein:

the virtual object is a first virtual object;

the images of the first virtual environment are first images; and the operations further comprise:

identifying, in the second coordinate system of the second virtual environment, a location and orientation of a second virtual object that includes a second virtual surface;

identifying a relationship between (i) the second coordinate system of the second virtual environment and (ii) a third coordinate system of a third virtual environment, wherein the relationship is defined according to the location and orientation of the second virtual object in the second coordinate system of the second virtual environment; and for each eyepoint of the eyepoint pair, determining, using the identified relationship, a respective different perspective of the third virtual environment from which the user can view the third virtual environment using the second virtual surface of the second virtual object, wherein, for each particular eyepoint of the eyepoint pair, the respective rendering of the second virtual environment includes a respective different rendering, on the second virtual surface of the second virtual object, of the third virtual environment according to the respective different perspective of the third virtual environment for the particular eyepoint.

\* \* \* \* \*